United States Patent
Lindstrom et al.

(10) Patent No.: US 10,252,303 B2
(45) Date of Patent: Apr. 9, 2019

(54) METHOD TO REMEDIATE SOIL AND GROUNDWATER

(71) Applicants: Michael Lindstrom, Denver, CO (US); James Dawe, Denver, CO (US)

(72) Inventors: Michael Lindstrom, Denver, CO (US); James Dawe, Denver, CO (US)

(*) Notice: Subject to any disclaimer, the term of this patent is extended or adjusted under 35 U.S.C. 154(b) by 0 days.

(21) Appl. No.: 15/170,641

(22) Filed: Jun. 1, 2016

(65) Prior Publication Data

US 2016/0346818 A1  Dec. 1, 2016

Related U.S. Application Data

(60) Provisional application No. 62/169,370, filed on Jun. 1, 2015.

(51) Int. Cl.
*B09C 1/00* (2006.01)
*B09C 1/08* (2006.01)

(52) U.S. Cl.
CPC .......... *B09C 1/002* (2013.01); *B09C 1/08* (2013.01)

(58) Field of Classification Search
CPC .............. B09C 1/002; B09C 1/02; B09C 1/08
USPC .................................. 405/128.75
See application file for complete search history.

(56) References Cited

U.S. PATENT DOCUMENTS

| | | | | |
|---|---|---|---|---|
| 4,464,268 A | * | 8/1984 | Schievelbein | C09K 8/524 166/307 |
| 4,588,506 A | * | 5/1986 | Raymond | A62D 3/02 166/246 |
| 4,591,443 A | * | 5/1986 | Brown | A62D 3/38 166/300 |
| 4,867,238 A | * | 9/1989 | Bayless | C09K 8/845 166/261 |
| 4,927,293 A | * | 5/1990 | Campbell | B09C 1/08 404/92 |
| 5,037,240 A | * | 8/1991 | Sherman | B09C 1/00 405/128.15 |
| 5,259,962 A | | 11/1993 | Later | |
| 5,286,141 A | * | 2/1994 | Vigneri | B01F 3/0865 210/170.07 |
| 5,525,008 A | * | 6/1996 | Wilson | B09C 1/00 405/128.5 |
| 5,741,427 A | * | 4/1998 | Watts | B09C 1/002 210/747.8 |
| 5,906,917 A | | 5/1999 | Hammond | |
| 5,954,452 A | * | 9/1999 | Goldstein | B01F 5/043 166/250.01 |

(Continued)

FOREIGN PATENT DOCUMENTS

| | | |
|---|---|---|
| CA | 2252341 | 5/1999 |
| CA | 2268583 | 10/2000 |

(Continued)

OTHER PUBLICATIONS

"900 Series Exploration and Production Waste Management," Colorado Oil & Gas Conservation Commission, Jan. 30, 2015, 24 pages.

*Primary Examiner* — Tara Mayo-Pinnock
(74) *Attorney, Agent, or Firm* — Sheridan Ross P.C.

(57) ABSTRACT

This present invention is directed to a method to remediate soil and groundwater. Embodiments of the present invention can be conducted ex-situ within the footprint of the area to be remediated. The method utilizes hydrogen peroxide.

20 Claims, 1 Drawing Sheet

(56) References Cited

U.S. PATENT DOCUMENTS

| | | | |
|---|---|---|---|
| 6,158,924 | A | 12/2000 | Athens et al. |
| 6,276,871 | B1 | 8/2001 | Bruso |
| 6,283,675 | B1 * | 9/2001 | Dulsey ............... B09C 1/08 405/128.5 |
| 6,319,328 | B1 * | 11/2001 | Greenberg ............ B09C 1/002 134/10 |
| 6,787,034 | B2 | 9/2004 | Noland et al. |
| 7,040,398 | B2 | 5/2006 | Wellington et al. |
| 8,858,806 | B1 | 10/2014 | Cox |
| 2004/0165956 | A1 | 8/2004 | Greenberg |
| 2008/0008535 | A1 | 1/2008 | Ball |
| 2009/0087265 | A1 | 4/2009 | Lundy |
| 2014/0335601 | A1 | 11/2014 | Scalzi et al. |
| 2014/0335602 | A1 | 11/2014 | Scalzi et al. |
| 2015/0021275 | A1 * | 1/2015 | Cronk ............... B09C 1/08 210/741 |
| 2015/0343503 | A1 | 12/2015 | Lundy |
| 2016/0096212 | A1 | 4/2016 | Day |

FOREIGN PATENT DOCUMENTS

| | | |
|---|---|---|
| EP | 741611 | 8/2000 |
| EP | 851843 | 4/2004 |
| WO | WO 94/21346 | 9/1994 |
| WO | WO 2005/012181 | 2/2005 |
| WO | WO 2006/128797 | 12/2006 |
| WO | WO 2014/182572 | 11/2014 |
| WO | WO 2015/170317 | 11/2015 |
| WO | WO 2015/187692 | 12/2015 |
| WO | WO 2016/054438 | 4/2016 |
| WO | WO 2016/061541 | 4/2016 |

* cited by examiner

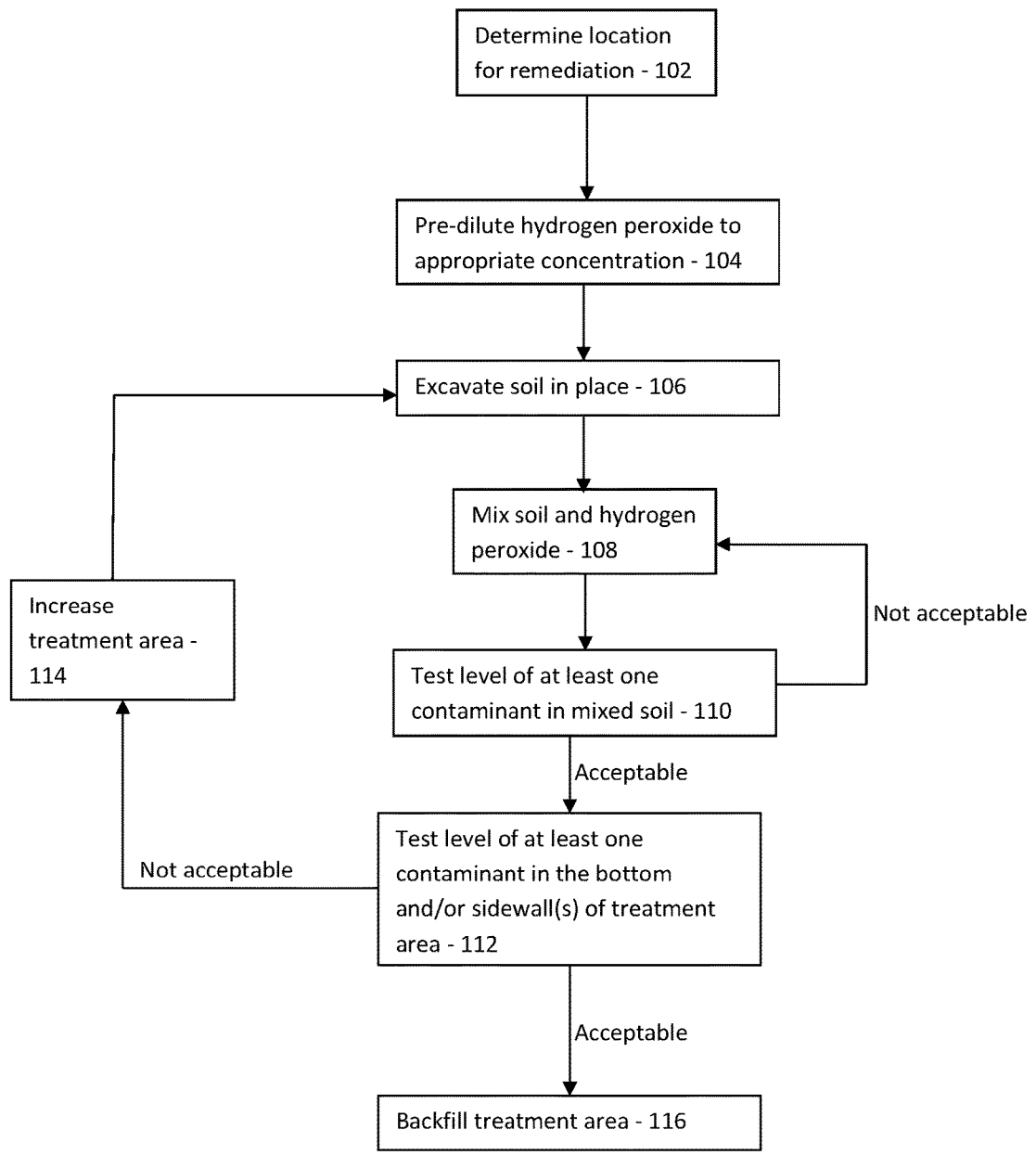

METHOD TO REMEDIATE SOIL AND GROUNDWATER

CROSS REFERENCE TO RELATED APPLICATIONS

This application claims priority and the benefit under 35 U.S.C. § 119(e) to U.S. Provisional Application Ser. No. 62/169,370, filed on Jun. 1, 2015, which is incorporated by reference in its entirety.

FIELD OF THE INVENTION

This present invention is directed to a method to remediate soil and water, which can include groundwater. Embodiments of the present invention can be conducted ex-situ within the footprint of the area to be remediated. The method utilizes hydrogen peroxide.

BACKGROUND

In traditional soil remediation, the contaminated soil is excavated using large machinery before it is treated, and involves removal of the soil from the site, and disposal at a licensed disposal facility. Other remediation methods utilize large footprint soil shredding machines or pugmills to breakup excavated soil and introduce chemical oxidant to the material. This method requires a large footprint for equipment and material processing. Many in-situ and ex-situ soil and groundwater remediation technologies require activation of a chemical oxidant using a chelating agent (for example, iron) and/or an acid or base agent sufficient to adjust a pH of the treated soil. Furthermore, soil and groundwater treatment technologies rely on injection technologies to introduce the oxidant and reagents into the ground which results in poor oxidant to mass contact. Thus, traditional remediation soil and groundwater methods involve high cost, are difficult to implement, and add time to remediate the soil and water.

U.S. Patent Publication No. 2009/0087265 entitled "Remediation of Contaminants from In-Situ and Ex-Situ Media" discuses a remediation method using a composition for emulsifying a contaminant ground media, that includes a chelating agent. WIPO Application No. WO2015/170317 entitled "Remediation of Contaminated Soils" discuses a process for treating a soil contaminated with a pollutant with an aqueous solution comprising a combination of hydrogen peroxide and hydroxide source. U.S. Patent Publication No. 2015/0343503 entitled "In-Situ Subsurface Extraction and Decontamination" discusses a method of decontaminating ground media that includes drilling injection and extraction holes into ground media to a particular depth, then injecting a reagent into the injection hole to treat the ground media. The reagent includes a chelating agent. European Application No. EP741611 entitled "Process for Soil Decontamination by Oxidation and Vacuum Extraction" discusses a process for in-situ treatment of a contaminated subsurface zone of the earth containing a contaminant. The method requires vacuum extraction. U.S. Pat. No. 6,276,871 entitled "Soil Remediation Method" discusses a soil remediation method that uses iron in combination with an oxidant. U.S. Patent Publication No. 2008/0008535 entitled "Soil and Water Remediation Method and Apparatus" discusses a method, apparatus and system for the remediation of contaminated soils, groundwater and water. A combination of reagents such as persulfate and ozone or persulfate, ozone and hydrogen peroxide may be used to enhance destruction of organic contaminants. U.S. Pat. No. 8,858,806 entitled "Method for Reducing Contamination" discusses methods for reducing a concentration of a contaminant associated with a medium, which can be any substance or material, such as soil, water, air, and/or fluid. The medium is treated with a ferric chelate and an oxidizing agent.

The present invention has advantages over these methods that will become apparent.

SUMMARY

The present invention can be conducted ex-situ within the footprint of the area to be remediated. Ex-situ chemical treatment recycles the native soil impacted by petroleum hydrocarbons and eliminates the need for large machinery, haul trucks, import fill material, and waste disposal. Furthermore, the invention utilizes hydrogen peroxide without chelating agents, heat, or pH adjustment to oxidize petroleum compounds. The release of these compounds to the atmosphere is minimal compared to a soil vapor extraction technology, which discharges nearly all the petroleum hydrocarbon compounds as petroleum vapor or carbon dioxide when thermally treated. In addition, ex-situ chemical soil treatment does not have the same limitations that in-situ chemical injection does as oxidants contact with the contaminate is optimized during the mixing process.

The present invention effectively reduces the contaminant level in the soil. The present invention can be utilized on any size of a site where the soil contains unwanted contaminants, including but not limited to, hydrocarbon contamination sites. Contaminants in hydrocarbon contaminations sites can include, but are not limited to, petroleum hydrocarbons (e.g. benzene, toluene, ethylebenzene and/or xylenes), polyaromatic hydrocarbons (PAH), and chlorinated solvents.

The soil mixing method of the present invention is a remediation approach that couples chemical soil oxidation with mechanical excavation using a hydraulic excavator. Advantageously, the remediation method of the present invention minimizes equipment (does not utilize pugmills, shredding machines, or trenchers) and the treatment footprint while maximizing the benefits of on-site treatment and reuse of soil. One such benefit is that soil mixing reuses the treated soil, allowing for up to 100% reduction in haul truck traffic to disposal facilities and backfill borrow sites. Furthermore, specialized equipment is not necessary to achieve efficient contact between the oxidants and the soil, even in environments with higher clay content. Another advantage of the invention is that it does not require additional chemicals be combined with the oxidant. Thus, unlike prior methods, it is not necessary to use an iron compound, a chelating agent or combinations of oxidants to effectively remove contaminants from the soil. Rather, it is possible to use a single oxidant to effectively remediate soil.

The present invention can be used on a variety of soil types. For example, the invention can be used on sand, silt, and in some cases clay as well as fractured/weathered sedimentary bedrock. Furthermore, the present invention can be used to remediate saturated soil and groundwater in-situ.

This present invention can be scaled to virtually any project size (for example between about 500 cubic yards and 20,000+ cubic yards). Due to the nature of hydrogen peroxide as an effective oxidant for a broad range of volatile organic compounds, this process can be used in virtually any industrial sector where a hydrocarbon spill has occurred.

An aspect of the invention is a method to remediate soil. The method includes providing hydrogen peroxide to soil in a treatment area. An additive is not combined with the hydrogen peroxide. The treatment area is excavated in place to mix the soil in the treatment area with the hydrogen peroxide to produce remediated soil.

An aspect of the invention is a method to treat groundwater in-situ. The method includes providing an oxidant to the groundwater, in-situ. The oxidant does not include an additive combined with the oxidant. The oxidant is mixed with the groundwater, and allowed to contact the groundwater following mixing.

An aspect of the invention is a method to simultaneously treat soil and groundwater in-situ. The method includes providing an oxidant to the soil and the groundwater in-situ, mechanically mixing the oxidant with the soil and the groundwater, and contacting the oxidant with the soil and the groundwater.

BRIEF DESCRIPTION OF THE FIGURES

FIG. 1 illustrates a method to remediate soil with hydrogen peroxide of the present invention.

DETAILED DESCRIPTION

The present invention is related to a method to remediate soil and groundwater. The soil mixing method of the present invention can be used on sites of any size. Petroleum hydrocarbon and solvent release locations can be remediated with the present invention.

An aspect of the invention is a method to remediate soil. The method includes providing an oxidant to soil in a treatment area. The treatment area is excavated, and the soil in the treatment area is mixed with the hydrogen peroxide to produce remediated soil.

The soil to be treated can be any type of soil, including but not limited to, silty fine grain sand, weathered sandstone, fractured bedrock sandstone, claystone, fine grain sand, silty sand, sand, silt, clay or combinations thereof. The ratio of the oxidant to soil can be between about 1 lb oxidant: 49 lbs soil and about 1 lb oxidant: 105 lbs soil. By way of example, if about 10,000 lbs of impacted soil is to be treated, one could use about 161 lbs of the oxidant to treat the soil (ratio of about 1:about 62). The concentration of the oxidant can be between about 8% and about 34% depending on soil type and hydrocarbon concentration. The ratio of oxidant to soil can depend upon the type of soil. Thus, the amount of oxidant required to the treat the soil can depend on the amount of contaminants present in the soil. One skilled in the art would understand that more oxidant will be required to treat a high concentration of contaminants. The soil type can also have an effect on the ratio of oxidant to soil. Denser materials, like claystone can require a higher ratio than unconsolidated soil, such as a fine grain sand. The oxidant can be hydrogen peroxide, activated persulfate, and permanganate. Persulfate can be activated by adding iron, heat, hydrogen peroxide or a base, such as sodium hydroxide to increase the pH of the soil or groundwater to about 10. The ratios are driven by the concentrations and the presence of the contaminant. The higher the contaminant level, the more oxidant it takes to treat the contaminants. In some embodiments, a dose rate of about 4,200 gallons of oxidant per 1000 cubic yards of soil can be used to treat soil. This equates to about 42,000 lbs of peroxide to 2,600,000 pounds of impacted soil (1 lb ox: 62 lb soil).

The remediation time for treated soil and water can be between about 2 days and about 8 days. Remediation time includes between about 3 to 10 minutes of physical mixing, followed by about 48 to 168 hours of contact time, in some embodiments between about 48 hours to about 72 hours. The temperature during the mixing can be largely dependent upon the season and location of treatment. The temperature can be above the freezing point of the oxidant, but below the boiling point of the oxidant. By way of example, if the oxidant is hydrogen peroxide, then a suitable operating temperature range can be between about 0° F. and below about 140° F.

Excavation can be performed with standard excavating machinery. One skilled in the art would understand that multiple excavation machines can be used without deviating from the invention. Mixing can be performed with any size hydraulic excavator.

The treatment area can be divided into treatment zones. The treatment zones can be the same size or can be different sizes. Measurements for levels of contamination can be taken from each treatment zone, and each zone treated to reduce the contaminant level. The size of the treatment zone can be determined by a regulation without deviating from the invention. By way of example, a regulation can require that a sample be taken and tested every about 100 cubic yards.

After an initial treatment, if at least one of the contaminant levels is found to be greater than an acceptable amount, additional cycles of the method can be performed. In some embodiments, the method of the present invention can be repeated until all contaminants that are required to be remediated by a federal or local agency, and/or by a user, are within an acceptable limit. Contaminants include, but are not limited to, petroleum hydrocarbons (such as toluene, xylene, benzene, ethylbenzene), and total volatile and extractable petroleum hydrocarbons (TPH), PAHs, chlorinated solvents, and combinations thereof. Acceptable contamination amounts can be set by state and federal regulations, or determined for a particular application. By way of example only, in Colorado the allowable levels are regulated by the Colorado Oil and Gas Conservation Commission (available at cogcc.state.co.us/documents/reg/Rules/LATEST/900series.pdf, last viewed May 12, 2016) ("Colorado Contaminant Levels"). Table 1 includes a list of organic contaminants to be remediated along with the allowable limits of organic contaminants in soil in Colorado.

TABLE 1

| Contaminant | Allowable level in Soil (mg/kg) |
|---|---|
| TPH | 500 |
| Benzene | 0.17 |
| Toluene | 85 |
| Ethylbenzene | 100 |
| Xylenes (total) | 175 |
| Napthalene | 23 |
| Liquid hydrocarbons including condensate and oil | Below detectable level |

Other jurisdictions may set other limitations that differ from the limitations set forth in Table 1. Furthermore, additional contaminants for removal or level reduction may be required in other jurisdictions. The present invention can be used in these jurisdictions to meet the levels for removal of the contaminants without deviating from the invention.

Additional treatment cycles can be necessary to sufficiently reduce the level of contaminants in the soil. Thus, additional cycles can be repeated until the level of the contaminant(s) is acceptable. The additional cycles include providing additional oxidant to the remediated soil, and mixing the additional oxidant and the remediated soil in the treatment area to produce further remediated soil. The ratio of the additional oxidant to soil can be the same as the ratio of the first ratio of oxidant to soil, or it can be adjusted. Furthermore, if more than one additional cycle is required, the ratio of oxidant to soil can be adjusted for each cycle. By way of non-limiting example, the ratio of the additional oxidant to soil can be between 1 lb oxidant: 49 lbs soil and about 1 lb oxidant: 105 lbs soil. The concentration of the additional oxidant can be between about 8% and about 34%. Furthermore, the same oxidant used in the initial treatment cycle can be used for additional treatment cycles.

The level of at least one contaminant can also be measured in the base of the treatment area, or in at least one sidewall of the treatment area (i.e. undisturbed area adjacent to the treatment area). This measurement can be made to determine if a sufficient area of soil has been treated or if the area should be expanded. If the measurement in the base of the treatment area or at least one sidewall of the treatment area is not acceptable, the treatment area can be expanded and the new treatment area treated with hydrogen peroxide. Additional contaminant level sampling can also be performed to determine the extent of additional excavation that is required. Additional remediation cycles can be performed as necessary. After the contaminant levels have been found acceptable (typically for all the contaminants), the treated soil can be backfilled into the treatment area.

During treatment, contaminants can be detected using a photo-ionization detector (PID) instrument. A PID is a field instrument that detects the contaminant reading from a sample media (for example soil) using photoionization. Decreasing PID measurements indicates that the levels of contaminants are decreasing in the soil.

In some embodiments, it can be preferable to characterize the treatment area prior to remediation. Factors to characterize the treatment area can include classifying the type of soil, classifying the geology, determining the presence and depth to any groundwater, determine the lateral and horizontal effects of the contamination in the soil and groundwater (if applicable), determine contaminant type (i.e. petroleum hydrocarbon, TPH, PAHs, chlorinated solvents, etc.) and concentration range, identify any site constraints (including surface structures and infrastructure, access to treatment area, surface ownership agreements, and the like). At least one of these factors can be evaluated to characterize the treatment area.

In some embodiments, the remediation method can be assessed for feasibility for a particular treatment area prior to remediation. Factors relevant to the feasibility include, but are not limited to, calculation of soil volume, calculation of contaminant mass, calculation of saturated soil volume, calculation of dissolved phase contaminant mass, determining the geology type, determining the soil oxidant demand, determining the contaminant type, determining the ratio of hydrogen peroxide to soil, feasibility testing, and evaluation of feasibility. At least one of these factors can be evaluated to characterize the feasibility of the remediation treatment.

An aspect of the invention is a method to treat groundwater. The method includes providing hydrogen peroxide to the groundwater in-situ. Hydrogen peroxide can be pumped, sprayed, or gravity drained into an open excavation and mixed with groundwater. The groundwater can be mechanically mixed with the hydrogen peroxide for between about 3 and 10 minutes per treatment area to allow the peroxide to make contact with the impacted groundwater. The groundwater and soil are contacted for a minimum of about 48 hours, in some embodiments between about 48 hours and 72 hours before confirmation samples can be collected. A hydrogen peroxide concentration of between about 17.5% and 34% can be used to treat groundwater. The treatment ratio can range between about 1 lb oxidant: 0.6 gal groundwater to about 1 lb oxidant: 23 gal groundwater.

The ratio of oxidant to amount of groundwater can depend on the amount of contaminate present in the groundwater. One skilled in the art would understand that more oxidant will be required to treat a high concentration of contaminants. The oxidant can be hydrogen peroxide, activated persulfate, and permanganate. Persulfate can be activated by adding iron, heat, hydrogen peroxide or a base, such as sodium hydroxide to increase the pH of the soil or groundwater to about 10. The ratios are driven by the concentrations and the presence of the contaminant. The higher the contaminate level, the more oxidant it takes to treat the contaminants.

The remediation time for treated water can be between about 2 days and about 8 days. Remediation time includes between about 3 to 10 minutes of physical mixing, followed by about 48 to 168 hours of contact time, in some embodiments between about 48 hours to about 72 hours. The temperature during the mixing can be largely dependent upon the season and location of treatment. The temperature can be above the freezing point of the oxidant, but below the boiling point of the oxidant. By way of example, if the oxidant is hydrogen peroxide, then a suitable operating temperature range can be between about 0° F. and below about 140° F.

Mixing can be performed with any size hydraulic excavator.

After an initial treatment, if at least one of the contaminant levels is found to be greater than an acceptable amount, additional cycles of the method can be performed. In some embodiments, the method of the present invention can be repeated until all contaminants that are required to be remediated by a federal or local agency, and/or by a user, are within an acceptable limit. Contaminants include, but are not limited to, petroleum hydrocarbons (e.g. toluene, xylene, benzene, ethylbenzene), and liquid hydrocarbons including condensate and oil, PAHs, and chlorinated solvents, and combinations thereof. Acceptable contamination amounts can be set by state and federal regulations, or determined for a particular application. By way of example only, in Colorado the allowable levels are regulated by the Colorado Oil and Gas Conservation Commission. Table 2 includes the allowable limits of organic compounds in groundwater in Colorado (from Colorado Contaminant Levels).

TABLE 2

| Contaminant | Allowable level in Water (µg/L) |
| --- | --- |
| Benzene | 5 |
| Toluene | 560 |
| Ethylbenzene | 700 |
| Xylenes (total) | 1,400 |
| Liquid hydrocarbons including condensate and oil | Below detection level |

Other jurisdictions may set other limitations that differ from the limitations set forth in Table 2. Furthermore, additional contaminants for removal or level reduction may be required in other jurisdictions. The present invention can be used in these jurisdictions to meet the levels for removal of the contaminants without deviating from the invention.

Additional treatment cycles can be necessary to sufficiently reduce the level of contaminants in the groundwater. Thus, additional cycles can be repeated until the level of the contaminant(s) is acceptable. The additional cycles include providing additional oxidant to the remediated groundwater, and mixing the additional oxidant and the remediated groundwater in the treatment area to produce further remediated groundwater. The ratio of the additional oxidant to groundwater can be the same as the ratio of the first ratio of oxidant to groundwater, or it can be adjusted. Furthermore, if more than one additional cycle is required, the ratio of oxidant to groundwater can be adjusted for each cycle. By way of non-limiting example, the ratio of the additional oxidant to groundwater can be between 1 lb oxidant: 49 lb s soil and about 1 lb oxidant: 105 lbs soil using a peroxide solution at a concentration between about 17.5 and 34%. Furthermore, the same oxidant used in the initial treatment cycle can be used for additional treatment cycles.

During treatment, contaminants can be detected using a PID instrument. A PID is a field instrument that detects contaminant readings from a sample media (for example groundwater) using photoionization. Decreasing PID measurements indicates that the levels of contaminants are decreasing in the groundwater.

In some embodiments, it can be preferable to characterize the treatment area prior to remediation. Factors to characterize the treatment area can include classifying the geology, determining the presence and depth to any groundwater, determine the lateral and horizontal effects of the contamination in the groundwater, determine contaminant type (i.e. petroleum hydrocarbon, TPH, PAHs, chlorinated solvents, etc.) and concentration range, identify any site constraints (including surface structures and infrastructure, access to treatment area, surface ownership agreements, and the like). At least one of these factors can be evaluated to characterize the treatment area.

In some embodiments, the remediation method can be assessed for feasibility for a particular treatment area prior to remediation. Factors relevant to the feasibility include, but are not limited to, calculation of groundwater volume, calculation of contaminant mass, calculation of dissolved phase contaminant mass, determine the geology type, determining the groundwater oxidant demand, determining the contaminant type, determining the ratio of hydrogen peroxide to groundwater, feasibility testing, and evaluation of feasibility. At least one of these factors can be evaluated to characterize the feasibility of the remediation treatment.

An aspect of the invention is a method to treat groundwater and soil below the water table. Hydrogen peroxide is pumped, sprayed, or gravity drained into an open excavation and mixed along with saturated soil. The impacted saturated soil is not excavated and treated out of the excavation, rather left in place for mixing and treatment with hydrogen peroxide. The soil and groundwater are mechanically mixed for between about 3 and 10 minutes to allow the peroxide to make contact with the impacted groundwater and saturated soil. The groundwater and soil is contacted with the peroxide for a minimum of about 48 hours, in some embodiments between about 48 and 72 hours.

Similar ratios as those used for soil treatment are utilized for groundwater and saturated soil treatment. By way of non-limiting example, the ratio of the oxidant to groundwater and soil can be between about 1 lb oxidant: 49 lbs soil and about 1 lb oxidant: 105 lbs soil using a peroxide solution at a concentration between about 17.5 and 34%.

The soil to be treated can be any type of soil, including but not limited to, silty fine grain sand, weathered sandstone, fractured bedrock sandstone, claystone, fine grain sand, silty sand, sand, silt, clay or combinations thereof. The ratio of the oxidant to soil can be between about 1 lb oxidant: 49 lbs soil and about 1 lb oxidant: 105 lbs soil. By way of example, if about 10,000 lbs of impacted soil is to be treated, one could use about 161 lbs of the oxidant to treat the soil (ratio of about 1:about 62). The concentration of the oxidant can be between about 17.5% and about 34% depending on soil type and hydrocarbon concentration. The ratio of oxidant to soil can depend upon the type of soil. Thus, the amount of oxidant required to the treat the soil can depend on the amount of contaminate present in the soil. One skilled in the art would understand that more oxidant will be required to treat a high concentration of contaminants. The soil type can also have an effect on the ratio of oxidant to soil. Denser materials, like claystone can require a higher ratio than unconsolidated soil, such as a fine grain sand. The oxidant can be hydrogen peroxide, activated persulfate, and permanganate. Persulfate can be activated by adding iron, heat, hydrogen peroxide or a base, such as sodium hydroxide to increase the pH of the soil or groundwater to about 10. The ratios are driven by the concentrations and the presence of the contaminate. The higher the contaminate level, the more oxidant it takes to treat the contaminants. In some embodiments, a dose rate of about 4,200 gallons of oxidant per 1000 cubic yards of soil can be used to treat soil. This equates to about 42,000 lbs of peroxide to 2,600,000 pounds of impacted soil (1 lb ox: 62 lb soil).

The remediation time for treating soil and water can be between about 2 days and about 8 days. Remediation time includes between about 3 to 10 minutes of physical mixing, followed by about 48 to 168 hours of contact time, in some embodiments between about 48 hours to about 72 hours. The temperature during the mixing can be largely dependent upon the season and location of treatment. The temperature can be above the freezing point of the oxidant, but below the boiling point of the oxidant. By way of example, if the oxidant is hydrogen peroxide, then a suitable operating temperature range can be between about 0° F. and below about 140° F.

Excavation can be performed with standard excavating machinery. One skilled in the art would understand that multiple excavation machines can be used without deviating from the invention. Mixing can be performed with any size hydraulic excavator.

The treatment area can be divided into treatment zones. The treatment zones can be the same size or can be different sizes. Measurements for levels of contamination can be taken from each treatment zone, and each zone treated to reduce the contaminant level. The size of the treatment zone can be determined by a regulation without deviating from the invention. By way of example, a regulation can require that a sample be taken and tested every about 100 cubic yards.

After an initial treatment, if at least one of the contaminant levels is found to be greater than an acceptable amount, additional cycles of the method can be performed. In some embodiments, the method of the present invention can be repeated until all contaminants that are required to be remediated by a federal or local agency, and/or by a user, are within an acceptable limit. Contaminants include, but are not limited to, petroleum hydrocarbons (e.g. toluene, xylene, benzene, ethylbenzene), and liquid hydrocarbons including condensate and oil, PAHs, and chlorinated solvents, and combinations thereof. Acceptable contamination amounts can be set by state and federal regulations, or determined for a particular application. By way of example only, in Colorado the allowable levels are regulated by the Colorado Oil and Gas Conservation Commission and are available as the Colorado Contaminant Levels. Table 1 includes a list of organic contaminants to be remediated along with the allowable limits of organic contaminants in soil in Colorado, while Table 2 includes a list of organic contaminants to be remediated along with allowable limits for organic contaminants in groundwater. When both soil and groundwater are remediated, the allowable concentration levels for groundwater can be used to determine when the soil and groundwater are remediated. Other jurisdictions may set other limitations that differ from the limitations set forth in Table 1 or Table 2. Furthermore, additional contaminants for removal or level reduction may be required in other jurisdictions. The present invention can be used in these jurisdictions to meet the levels for removal of the contaminants without deviating from the invention.

Additional treatment cycles can be necessary to sufficiently reduce the level of contaminants in the soil or groundwater. Thus, additional cycles can be repeated until the level of contaminant(s) is acceptable. The additional cycles include providing additional oxidant to the remediated soil and groundwater, and mixing the additional oxidant and the remediated soil and groundwater in the treatment area to produce further remediated soil. The ratio of the additional oxidant to soil and groundwater can be the same as the ratio of the first ratio of oxidant to soil and groundwater, or it can be adjusted. Furthermore, if more than one additional cycle is required, the ratio of oxidant to soil and groundwater can be adjusted for each cycle. By way of non-limiting example, the ratio of the additional oxidant to soil and groundwater can be between 1 lb oxidant: 49 lbs soil and about 1 lb oxidant: 105 lbs soil using a peroxide solution at a concentration between about 17.5 and 34%. Furthermore, the same oxidant used in the initial treatment cycle can be used for additional treatment cycles.

The level of at least one contaminant can also be measured in the base of the treatment area, or in at least one sidewall of the treatment area (i.e. undisturbed area adjacent to the treatment area). This measurement can be made to determine if a sufficient area of soil has been treated or if the area should be expanded. If the measurement in the base of the treatment area or at least one sidewall of the treatment area is not acceptable, the treatment area can be expanded and the new treatment area treated with hydrogen peroxide. Additional contaminant level sampling can also be performed to determine the extent of additional excavation that is required. Additional remediation cycles can be performed as necessary. After the contaminant levels have been found acceptable (typically for all the contaminants), the treated soil can be backfilled into the treatment area.

During treatment, contaminants can be detected using a PID instrument. A PID is a field instrument that detects the contaminant readings from a sample media (for example soil) using photoionization. Decreasing PID measurements indicates that the levels of contaminants are decreasing in the soil.

In some embodiments, it can be preferable to characterize the treatment area prior to remediation. Factors to characterize the treatment area can include classifying the type of soil, classifying the geology, determining the presence and depth to any groundwater, determine the lateral and horizontal effects of the contamination in the soil and groundwater (if applicable), determine contaminant type (i.e. petroleum hydrocarbon, TPH, PAHs, chlorinated solvents, etc.) and concentration range, identify any site constraints (including surface structures and infrastructure, access to treatment area, surface ownership agreements, and the like). At least one of these factors can be evaluated to characterize the treatment area.

In some embodiments, the remediation method can be assessed for feasibility for a particular treatment area prior to remediation. Factors relevant to the feasibility include, but are not limited to, calculation of soil volume, calculation of contaminant mass, calculation of saturated soil volume, calculation of dissolved phase contaminant mass, determining the geology type, determining the soil oxidant demand, determining the contaminant type, determining the ratio of hydrogen peroxide to soil, feasibility testing, and evaluation of feasibility. At least one of these factors can be evaluated to characterize the feasibility of the remediation treatment. When both the groundwater and soil are remediated, the allowable levels in the water can be the only levels measured as it can be assumed that if the groundwater levels are acceptable, the soil levels will also be acceptable. Suitable levels for the groundwater are set forth in Table 2.

An aspect of the invention is remediated soil. The remediated soil has been treated with hydrogen peroxide to reduce the level of at least one contaminant to less than a regulated amount.

The soil to be treated can be any type of soil, including but not limited to, silty fine grain sand, weathered sandstone, fractured bedrock sandstone, claystone, fine grain sand, silty sand, sand, silt, clay or combinations thereof. The ratio of the oxidant to soil can be between about 1 lb oxidant: 49 lbs soil and about 1 lb oxidant: 105 lbs soil. By way of example, if about 10,000 lbs of impacted soil is to be treated, one could use about 161 lbs of the oxidant to treat the soil (ratio of about 1:about 62). The concentration of the oxidant can be between about 8% and about 34% depending on soil type and hydrocarbon concentration. The ratio of oxidant to soil can depend upon the type of soil. Thus, the amount of oxidant required to the treat the soil can depend on the amount of contaminant present in the soil. One skilled in the art would understand that more oxidant will be required to treat a high concentration of contaminant. The soil type can also have an effect on the ratio of oxidant to soil. Denser soils, like claystone can require a higher ratio than uncompressed soil, such as a fine grain sand. The oxidant can be hydrogen peroxide, activated persulfate, and permanganate. Persulfate can be activated by adding iron, heat, hydrogen peroxide or a base, such as sodium hydroxide to increase the pH of the soil or groundwater to about 10. The ratios are driven by the contaminant concentrations and the presence of the contaminant. The higher the contaminant level, the more oxidant it takes to treat the contaminants. In some embodiments, a dose rate of about 4,200 gallons of oxidant per 1000 cubic yards of soil can be used to treat soil. This equates to about 142,000 lbs of peroxide to 2,600,000 pounds of impacted soil (1 lb ox: 62 lb soil).

The remediation time can be between about 2 days and about 6 days. Remediation time includes between about 3 to 10 minutes of physical mixing, followed by about 48 to 168 hours of contact time, in some embodiments between about 48 hours to about 72 hours. The temperature during the mixing can be largely dependent upon the season and location of treatment. The temperature can be above the freezing point of the oxidant, but below the boiling point of the oxidant. By way of example, if the oxidant is hydrogen peroxide, then a suitable operating temperature range can be between about 0° F. and below about 140° F.

Excavation can be performed with standard excavating machinery. One skilled in the art would understand that multiple excavation machines can be used without deviating from the invention. Mixing can be performed with any size hydraulic excavator.

The treatment area can be divided into treatment zones. The treatment zones can be the same size or can be different sizes. Measurements for levels of contamination can be taken from each treatment zone, and each zone treated to reduce the contaminant level. The size of the treatment zone can be determined by a regulation without deviating from the invention. By way of example, a regulation can require that a sample be taken and tested every about 100 cubic yards.

After an initial treatment, if at least one of the contaminant levels is found to be greater than an acceptable amount, additional cycles of the method can be performed. In some embodiments, the method of the present invention can be repeated until all contaminants that are required to be remediated by a federal or local agency, and/or by a user, are within an acceptable limit. Contaminants include, but are not limited to, petroleum hydrocarbons (e.g. toluene, xylene, benzene, ethylbenzene), and liquid hydrocarbons including condensate and oil, PAHs, and chlorinated solvents, and combinations thereof. Acceptable contamination amounts can be set by state and federal regulations, or determined for a particular application. By way of example only, in Colorado the allowable levels are regulated by the Colorado Oil and Gas Conservation Commission and are available as the Colorado Contaminant Levels. Table 1 includes a list of organic contaminants to be remediated along with the allowable limits of organic contaminants in soil in Colorado. Other jurisdictions may set other limitations that differ from the limitations set forth in Table 1. Furthermore, additional contaminants for removal or level reduction may be required in other jurisdictions. The present invention can be used in these jurisdictions to meet the levels for removal of the contaminants without deviating from the invention.

Additional treatment cycles can be necessary to sufficiently reduce the level of contaminants in the soil. Thus, additional cycles can be repeated until the level of the contaminant(s) is acceptable. The additional cycles include providing additional oxidant to the remediated soil, and mixing the additional oxidant and the remediated soil in the treatment area to produce further remediated soil. The ratio of the additional oxidant to soil can be the same as the ratio of the first ratio of oxidant to soil, or it can be adjusted. Furthermore, if more than one additional cycle is required, the ratio of oxidant to soil can be adjusted for each cycle. By way of non-limiting example, the ratio of the additional oxidant to soil can be between 1 lb oxidant: 49 lbs soil and about 1 lb oxidant: 105 lbs soil. The concentration of the additional oxidant can be between about 8% and about 34%. Furthermore, the same oxidant used in the initial treatment cycle can be used for additional treatment cycles.

The level of at least one contaminant can also be measured in the base of the treatment area, or in at least one sidewall of the treatment area (i.e. undisturbed area adjacent to the treatment area). This measurement can be made to determine if a sufficient area of soil has been treated or if the area should be expanded. If the measurement in the base of the treatment area or at least one sidewall of the treatment area is not acceptable, the treatment area can be expanded and the new treatment area treated with hydrogen peroxide. Additional contaminant level sampling can also be performed to determine the extent of additional excavation that is required. Additional remediation cycles can be performed as necessary. After the contaminant levels have been found acceptable (typically for all the contaminants), the treated soil can be backfilled into the treatment area.

During treatment, contaminants can be detected using a PID instrument. A PID is a field instrument that detects the contaminant readings from a sample media (for example soil) using photoionization. Decreasing PID measurements indicates that the levels of contaminants are decreasing in the soil.

In some embodiments, it can be preferable to characterize the treatment area prior to remediation. Factors to characterize the treatment area can include classifying the type of soil, classifying the geology, determining the presence and depth to any groundwater, determine the lateral and horizontal effects of the contamination in the soil and groundwater (if applicable), determine contaminant type (i.e. petroleum hydrocarbon, TPH, PAHs, chlorinated solvents, etc.) and concentration range, identify any site constraints (including surface structures and infrastructure, access to treatment area, surface ownership agreements, and the like). At least one of these factors can be evaluated to characterize the treatment area. In some embodiments, the remediation method can be assessed for feasibility for a particular treatment area prior to remediation. Factors relevant to the feasibility include, but are not limited to, calculation of soil volume, calculation of contaminant mass, calculation of saturated soil volume, calculation of dissolved phase contaminant mass, determining the geology type, determining the soil oxidant demand, determining the contaminant type, determining the ratio of hydrogen peroxide to soil, feasibility testing, and evaluation of feasibility. At least one of these factors can be evaluated to characterize the feasibility of the remediation treatment.

FIG. 1 illustrates a method to remediate soil and groundwater of the present invention. The method includes determining the location for remediation 102. The location can be determined by measuring the initial contamination levels in the soil and groundwater, if present. When at least one contaminant is outside an acceptable limit, the area can be remediated using the present invention. Hydrogen peroxide is diluted to a predetermined level 104. The soil or saturated soil is excavated in place 106, and can use common excavation machinery known in the art. The soil, saturated, and/or groundwater is mixed with the diluted hydrogen peroxide 108 and allowed to treat the material for a minimum of about 48 hours, in some embodiments, in some embodiments between about 48 hours and about 72 hours. The levels of the contaminants are again measured to determine if at least one contaminant level it is within the acceptable limit 110. If it is not, then the impacted material is mixed again with hydrogen peroxide. If the levels of the contaminants are acceptable, then the margins of the treatment area can be determined by testing the treated material by accepted regulatory agency laboratory analytical methods at the base of the treatment area, and/or sidewalls of the treatment area 112. If the levels in the base or sidewalls of the treatment area are acceptable, then the treatment area can be backfilled with the remediated soil 116. If the levels in the bottom or sidewalls of the treatment area are not acceptable, then the treatment area should be increased 114 and treatment repeated until acceptable levels are achieved.

EXAMPLES

Ground Water

Regulations set limits on certain contaminants in ground water (see Table 2). By way of example only, in Colorado the maximum amount of benzene can be 5 µg/L, 560 µg/L toluene, 700 µg/L ethylbenzene, and 1,400 µg/L total xylenes.

Example 1

Ground water was treated by using the method discussed herein. The levels of benzene, toluene, ethylbenzene, and xylenes were measured after several cycles. The initial sample of the ground water included 2800 µg/L benzene, 77 µg/L toluene, 430 µg/L ethylbenzene, and 1,400 µg/L total xylenes. Table 3 illustrates the levels of these contaminants after several rounds of treatment.

TABLE 3

| | Sample | | | | |
|---|---|---|---|---|---|
| | Benzene (µg/L) | Toluene (µg/L) | Ethylbenzene (µg/L) | Total xylenes (µg/L) | $H_2O_2$ (gallons) |
| Treatment Round 1 | | | | | |
| 1 | 120 | 9.4 | 32 | 340 | 1000 |
| 2 | 130 | 11 | 36 | 380 | 1000 |
| 3 | 150 | 11 | 38 | 410 | 1000 |
| 4 | 49 | 6.3 | 28 | 150 | 1400 |
| 5 | 37 | 6.2 | 25 | 150 | 1400 |
| 6 | 43 | 6.9 | 27 | 150 | 1400 |
| Treatment Round 2 | | | | | |
| 1 | 1.3 | <1.0 | 2.3 | 27 | 600 |
| 2 | 1.2 | <1.0 | <1.0 | 11 | 600 |
| 3 | 140 | <1.0 | 12 | 51 | 600 |
| 4 | 9.8 | 7.4 | 13 | 160.0 | 600 |
| 5 | 24 | 19 | 26 | 320 | 600 |
| 6 | 26 | 15 | 21 | 290 | 600 |
| 7 | 4.3 | 3.6 | 7.6 | 120 | 600 |
| Treatment Round 3 | | | | | |
| 1 | <1.0 | <1.0 | <1.0 | <1.0 | 600 |
| 2 | <1.0 | <1.0 | <1.0 | <1.0 | 600 |
| 3 | <1.0 | <1.0 | <1.0 | <1.0 | 600 |
| 4 | <1.0 | <1.0 | <1.0 | 6 | 600 |
| 5 | <1.0 | <1.0 | <1.0 | 6.1 | 600 |
| 6 | <1.0 | <1.0 | <1.0 | 4.5 | 600 |
| 7 | 44 | 31 | 22 | 370 | 600 |

The treatment was repeated until the levels of the contaminants was within the acceptable limits. Table 3 also illustrates that the levels of the contaminants decreased with repeated treatment.

Example 2

Ground water from a well was remediated using the method of the present invention. The initial sample of the ground water included 134 µg/L benzene, 5 µg/L toluene, 198 µg/L ethylbenzene, and 1,400 µg/L total xylenes. Table 4 illustrates the levels of the contaminants after treatment.

TABLE 4

| | Sample | | | | |
|---|---|---|---|---|---|
| | Benzene (µg/L) | Toluene (µg/L) | Ethylbenzene (µg/L) | Total xylenes (µg/L) | $H_2O_2$ (gallons) |
| Source Well | 45.9 | <4.0 | 9.4 | <4.0 | 8,750 |
| Down-Gradient Well | <1.0 | <1.0 | <1.0 | <1.0 | 0 |

Soil

Regulations set limits on certain contaminants in soil. By way of example only, in Colorado the maximum amount of benzene can be 0.17 mg/kg, 85 mg/kg toluene, 100 mg/kg ethylbenzene, 175 mg/kg total xylenes, and 500 mg/kg TPH (see Table 1).

Example 3

A soil sample was remediated using the method of the present invention. The initial concentrations of the contaminants were about 16 mg/kg benzene, 29 mg/kg toluene, 1 mg/kg ethylbenzene, 6.6 mg/kg total xylene, and 390 mg/kg TPH. The soil type was fine grain sand and weathered sandstone and the average temperature during treatment was about 70° F. (fall). The treatment time was about 2 months. The total volume of soil treated was about 14,000 cubic yards. Table 5 illustrates the levels of the contaminants during and after treatment. Also noted in Table 5 is a PID reading. A PID is a field instrument that detects the contaminant reading from a sample media (for example soil) using photoionization. Decreasing PID measurements indicates that the levels of contaminants are decreasing in the soil.

TABLE 5

| Sample | PID reading (ppm) | Benzene (mg/kg) | Toluene (mg/kg) | Ethylbenzene (mg/kg) | Total xylenes (mg/kg) | TPH (mg/kg) | $H_2O_2$ (gallons) |
|---|---|---|---|---|---|---|---|
| Treatment Round 1 | | | | | | | |
| 1 | 132.5 | 0.25 | <10 | <10 | <10 | <50 | 1000 |
| 2 | 114.6 | 0.24 | <10 | <10 | <10 | <50 | 1000 |
| 3 | 111.1 | 1.2 | <10 | <10 | <10 | 86 | 1000 |
| 4 | 167.1 | 0.25 | <10 | <10 | <10 | <50 | 1000 |
| 5 | 145.6 | 0.21 | <10 | <10 | <10 | <50 | 1000 |
| Treatment Round 2 | | | | | | | |
| 1 | 221.2 | 0.48 | <10 | <10 | <10 | <50 | 1000 |
| 2 | 34.7 | <0.1 | <10 | <10 | <10 | <50 | 1000 |
| 3 | 5.2 | <0.1 | <10 | <10 | <10 | <50 | 1000 |
| 4 | 139.2 | <0.1 | <10 | <10 | <10 | <50 | 1000 |
| 5 | 9.7 | <0.1 | <10 | <10 | <10 | <50 | 1000 |
| Treatment Round 3 | | | | | | | |
| 1 | 2.6 | <0.1 | <10 | <10 | <10 | <50 | 1000 |

Example 4

A soil sample was remediated using the method of the present invention. The baseline source concentrations of the contaminants were about 0.82 mg/kg benzene, 64 mg/kg toluene, 15 mg/kg ethylbenzene, 230 mg/kg total xylene, and 4,300 mg/kg TPH. The soil type was sand and the average temperature during treatment was about 85° F. (summer). The treatment time was about half a month. The total volume of soil treated was about 4,200 cubic yards. Table 6 illustrates the levels of the contaminants during and after treatment.

TABLE 6

| Sample | Benzene (mg/kg) | Toluene (mg/kg) | Ethylbenzene (mg/kg) | Total xylenes (mg/kg) | TPH (mg/kg) | H$_2$O$_2$ (gallons) |
|---|---|---|---|---|---|---|
| Treatment Round 1 | | | | | | |
| 1 | <0.0020 | 0.058 | 0.039 | 22 | 1,120 | 900 |
| 2 | 0.014 | 0.28 | <0.0050 | 8.9 | 720 | 900 |
| Treatment Round 2 | | | | | | |
| 1 | <0.0020 | 0.010 | <0.0050 | 0.85 | 214 | 0 |
| 2 | <0.0020 | <0.0050 | <0.0050 | <0.010 | 14 | 0 |

Example 5

A soil sample was remediated using the method of the present invention. The baseline source concentrations of the contaminants were about 0.82 mg/kg benzene, 1.6 mg/kg toluene, 10 mg/kg ethylbenzene, 86 mg/kg total xylene, and 2,800 mg/kg TPH. The soil type was silty fine grain sand, weathered sandstone and claystone and the average temperature during treatment was about 85° F. (summer). The treatment time was about 3 months. The total volume of soil treated was about 32,000 cubic yards. Table 7 illustrates the levels of the contaminants during and after treatment.

TABLE 7

| Sample | PID reading (ppm) | Benzene (mg/kg) | Toluene (mg/kg) | Ethylbenzene (mg/kg) | Total xylenes (mg/kg) | TPH (mg/kg) | H$_2$O$_2$ (gallons) |
|---|---|---|---|---|---|---|---|
| Treatment Round 1 | | | | | | | |
| 1 | 179 | 0.32 | 1.7 | 0.46 | 7.4 | 92 | 375 |
| 2 | 123 | 0.44 | 1.4 | 0.14 | 2.1 | 88 | 500 |
| 3 | 117 | 0.55 | 1.7 | 0.17 | 2.7 | 72 | 375 |
| 4 | 641.0 | 0.17 | 2.0 | 0.33 | 5.3 | 173 | 625 |
| 5 | 382.7 | 0.35 | 1.2 | 0.11 | 1.6 | 17 | 625 |
| 6 | 1,564 | 0.46 | 14 | 2.6 | 33 | 351 | 625 |
| 7 | 1,531 | 0.84 | 10 | 1.6 | 21 | 2,990 | 625 |
| 8 | 2,819 | 0.40 | 17 | 2.9 | 35 | 278 | 625 |
| 9 | 390.3 | 0.18 | 3.2 | 0.56 | 6.5 | 161 | 625 |
| 10 | 86.6 | 0.41 | 3.8 | 0.84 | 12 | 480 | 625 |
| 11 | 74.3 | <0.10 | <0.10 | <0.10 | <0.10 | 1,536 | 468 |
| 12 | 76.2 | 0.40 | 1.8 | 0.18 | 2.5 | 20 | 715 |
| Treatment Round 2 | | | | | | | |
| 1 | 14.3 | <0.10 | 0.21 | <0.10 | 1.0 | 86 | 500 |
| 2 | 50.5 | 0.46 | 1.9 | 0.35 | 5.5 | 160 | 375 |
| 3 | 18.8 | <0.10 | <0.10 | <0.10 | 0.16 | 4.3 | 500 |
| 4 | 39.7 | <0.10 | <0.10 | <0.10 | <0.10 | 6.3 | 312 |
| 5 | 3.9 | <0.10 | <0.10 | <0.10 | 0.45 | 7.4 | 715 |
| 6 | 12.7 | <0.10 | 0.14 | <0.10 | 0.50 | 8.4 | 715 |
| 7 | 37.9 | <0.10 | <0.10 | <0.10 | <0.10 | 1.4 | 715 |
| 8 | 10.7 | <0.10 | <0.10 | <0.10 | <0.10 | 3.6 | 715 |
| 9 | 5.5 | <0.10 | <0.10 | <0.10 | <0.10 | 6.3 | 715 |
| 10 | 17.3 | <0.10 | <0.10 | <0.10 | <0.10 | 1.1 | 555 |
| 11 | 3.1 | <0.10 | <0.10 | <0.10 | <0.10 | 2.9 | 715 |
| 12 | 13.8 | <0.10 | <0.10 | <0.10 | 0.19 | 2.9 | 857 |
| Treatment Round 3 | | | | | | | |
| 2 | 22.2 | <0.10 | <0.10 | <0.10 | 0.22 | 3.5 | 375 |

Example 6

A soil sample was remediated using the method of the present invention. The baseline source concentrations of the contaminants were about 0.71 mg/kg benzene, 2.8 mg/kg toluene, 1.1 mg/kg ethylbenzene, 7.6 mg/kg total xylene, and 990 mg/kg TPH. The soil type was fine grain sand and the average temperature during treatment was about 40° F. (winter). The treatment time was about 1 month. The total volume of soil treated was about 6,000 cubic yards. Table 8 illustrates the levels of the contaminants after treatment.

TABLE 8

| Sample | PID Reading (ppm) | Benzene (mg/kg) | Toluene (mg/kg) | Ethylbenzene (mg/kg) | Total xylenes (mg/kg) | TPH (mg/kg) | H$_2$O$_2$ (gallons) |
|---|---|---|---|---|---|---|---|
| Treatment Round 1 | | | | | | | |
| 1 | 81 | 0.072 | 0.063 | 0.036 | 0.40 | 12 | 750 |
| 2 | 134 | 0.013 | 0.019 | 0.064 | 0.40 | 25 | 750 |

Example 7

A soil sample was remediated using the method of the present invention. The baseline source concentrations of the contaminants were about 0.53 mg/kg benzene, 0.2 mg/kg toluene, 2.7 mg/kg ethylbenzene, 83 mg/kg total xylene, and 6,100 mg/kg TPH. The soil type was silty sand and the average temperature during treatment was about 40° F. (winter). The treatment time was about 1 month. The total volume of soil treated was about 6,000 cubic yards. Table 9 illustrates the levels of the contaminants during and after treatment.

TABLE 9

| Sample | PID Reading (ppm) | Benzene (mg/kg) | Toluene (mg/kg) | Ethylbenzene (mg/kg) | Total xylenes (mg/kg) | TPH (mg/kg) | H$_2$O$_2$ (gallons) |
|---|---|---|---|---|---|---|---|
| Treatment Round 1 | | | | | | | |
| 1 | 592 | <0.0020 | 0.047 | 0.094 | 2.0 | 690 | 583 |
| 2 | 562 | 0.0033 | 0.048 | 0.19 | 5.7 | 640 | 875 |
| 3 | 42.9 | <0.0020 | 0.063 | 0.12 | 1.7 | 700 | 300 |
| Treatment Round 2 | | | | | | | |
| 1 | 269 | <0.0020 | 0.016 | 0.023 | 0.59 | 256 | 443 |
| 2 | 290 | <0.0020 | 0.028 | 0.026 | 0.84 | 540 | 330 |
| 3 | 108.1 | <0.0020 | <0.0050 | 0.0060 | 0.098 | 169 | 422 |
| Treatment Round 3 | | | | | | | |
| 2 | 65.7 | <0.0020 | 0.0050 | 0.019 | 0.34 | 183 | 500 |

Example 8

A soil sample was remediated using the method of the present invention. The baseline source concentrations of the contaminants were about 0.71 mg/kg benzene, 2.8 mg/kg toluene, 0.2 mg/kg ethylbenzene, and 2.3 mg/kg total xylene. The soil type was silty sand and weathered sandstone, and the average temperature during treatment was about 65° F. (spring). The treatment time was about 2 months. The total volume of soil treated was about 14,000 cubic yards. Table 10 illustrates the levels of the contaminants after treatment.

TABLE 10

| Sample | PID Reading (ppm) | Benzene (mg/kg) | Toluene (mg/kg) | Ethylbenzene (mg/kg) | Total xylenes (mg/kg) | TPH (mg/kg) | H$_2$O$_2$ (gallons) |
|---|---|---|---|---|---|---|---|
| Treatment Round 1 | | | | | | | |
| 1 | 2.7 | <0.002 | <0.002 | <0.002 | 0.015 | 2.7 | 450 |
| 2 | 3.8 | <0.002 | 0.002 | <0.002 | 0.006 | 3.8 | 450 |

Example 9

A soil sample was remediated using the method of the present invention. The baseline source concentrations of the contaminants were about 0.53 mg/kg benzene, 1.2 mg/kg toluene, 12 mg/kg ethylbenzene, 17 mg/kg total xylene, and 3,800 mg/kg TPH. The soil type was silty sand and weathered sandstone, and the average temperature during treatment was about 65° F. (fall). The treatment time was about 1.5 months. The total volume of soil treated was about 4,200 cubic yards. Table 11 illustrates the levels of the contaminants during and after treatment.

TABLE 11

| Sample | PID reading (ppm) | Benzene (mg/kg) | Toluene (mg/kg) | Ethylbenzene (mg/kg) | Total xylenes (mg/kg) | TPH (mg/kg) | $H_2O_2$ (gallons) |
|---|---|---|---|---|---|---|---|
| Treatment Round 1 | | | | | | | |
| 1 | 531 | <0.0020 | <0.0050 | <0.0050 | 0.21 | 966 | 1,500 |
| 2 | 595 | <0.0020 | <0.0050 | <0.0050 | 0.055 | 561 | 1,500 |
| 3 | 385 | <0.0020 | <0.0050 | <0.0050 | 0.25 | 662 | 1,500 |
| 4 | 563 | <0.0020 | <0.0050 | <0.0050 | 0.14 | 643 | 1,500 |
| 5 | 235 | <0.0020 | <0.0050 | <0.0050 | 3.1 | 835 | 1,500 |
| 6 | 210 | 0.0050 | <0.0050 | 0.22 | 0.97 | 940 | 1,500 |
| 7 | 382 | 0.21 | 0.36 | 1.1 | 0.31 | 540 | 1,500 |
| 8 | 132.5 | <0.0020 | <0.0050 | 0.0051 | 0.050 | 760 | 1,000 |
| Treatment Round 2 | | | | | | | |
| 1 | 295 | <0.0020 | <0.0050 | <0.0050 | 0.069 | 140 | 250 |
| 2 | 280 | 0.0029 | <0.0050 | <0.0050 | 0.23 | 170 | 250 |
| 3 | 280 | <0.0020 | <0.0050 | <0.0050 | 0.024 | 140 | 250 |
| 4 | 228 | <0.0020 | <0.0050 | 0.0050 | 0.18 | 670 | 250 |
| 5 | 280 | <0.0020 | <0.0050 | <0.0050 | 0.12 | 240 | 250 |
| 6 | 280 | <0.0020 | <0.0050 | 0.012 | 0.30 | 250 | 250 |
| 7 | 225.5 | <0.0020 | <0.0050 | 0.0086 | 0.014 | 1,090 | 0 |
| 8 | 270 | <0.0020 | <0.0050 | <0.0050 | <0.010 | 107 | 500 |
| Treatment Round 3 | | | | | | | |
| 4 | 295 | <0.0020 | <0.0050 | 0.028 | 0.66 | 250 | 250 |
| 7 | 280 | <0.0020 | <0.0050 | <0.0050 | <0.010 | 49 | 500 |

In addition to treating the soil, groundwater present at the location was simultaneously treated. The initial groundwater sample contained 800 μg/L benzene, <1.0 μg/L toluene, 750 μg/L ethylbenzene, and 420 μg/L total xylenes. Table 12 illustrates the levels of the contaminants in groundwater during and after treatment.

TABLE 12

| Sample | | | | | |
|---|---|---|---|---|---|
| | Benzene (μg/L) | Toluene (μg/L) | Ethylbenzene (μg/L) | Total xylenes (μg/L) | $H_2O_2$ (gallons) |
| Treatment Round 1 | | | | | |
| 1 | 1.1 | <1.0 | <1.0 | 27 | 500 |
| 2 | 3.2 | <1.0 | 16 | 180 | 500 |
| 3 | 21 | <1.0 | 260 | 3,600 | 500 |
| 4 | <1.0 | <1.0 | <1.0 | 2.6 | 650 |
| 5 | 3.3 | <1.0 | 55 | 250 | 875 |
| 6 | <1.0 | <1.0 | 42 | 8.2 | 500 |
| 7 | <1.0 | <1.0 | 1.3 | 3.2 | 450 |
| 8 | <1.0 | <1.0 | 10 | 130 | 250 |
| Treatment Round 2 | | | | | |
| 3 | <1.0 | <1.0 | 11 | 61 | 250 |

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed:

1. A method to simultaneously remediate at least one contaminant in soil and groundwater in-situ in a treatment area, comprising:
    providing an oxidant to the soil and the groundwater in-situ, wherein the oxidant is not combined with an additive or an additive in the soil or the groundwater;
    mechanically mixing the oxidant with the soil and the groundwater;
    contacting the oxidant with the soil and the groundwater to produce a remediated soil and a remediated groundwater; and
    redistributing the remediated soil in the treatment area.

2. The method of claim 1, wherein the oxidant is hydrogen peroxide; and
    wherein the step of mechanically mixing comprises mechanically mixing the hydrogen peroxide and the soil in the treatment area.

3. The method of claim 2, wherein a ratio of the hydrogen peroxide to the soil is between about 1 lb oxidant: 49 lbs soil and about 1 lb oxidant: 105 lbs soil.

4. The method of claim 1, further comprising at least one additional remediation cycle, wherein the at least one additional remediation cycle comprises:
    measuring the at least one contaminant level in the remediated soil;
    providing an additional amount of the oxidant to the remediated soil;
    mixing the additional amount of the oxidant and the remediated soil in the treatment area to produce further remediated soil.

5. The method of claim 4, wherein the oxidant comprises hydrogen peroxide.

6. The method of claim 4, wherein the at least one additional remediation cycle is repeated until all contamination levels of the at least one contamination in the further remediated soil is below a regulation limit.

7. The method of claim 1, wherein the at least one contaminant in the soil is selected from the group consisting of a petroleum hydrocarbon, a polyaromatic hydrocarbon and a chlorinated solvent.

8. The method of claim 1, further comprising measuring at least one contaminant level in a base of the treatment area, or at least one sidewall of the treatment area.

9. The method of claim 8, further comprising increasing an area of the treatment area if the at least one contaminant level in the at least one side wall of the treatment area or the at least one base of the treatment area is greater than a regulation limit.

10. The method of claim 1, wherein a temperature during the mechanical mixing is between about 0° F. and about 140° F.

11. The method of claim 1, further comprising measuring a level of the at least one contaminant after between about 48 hours and about 72 hours.

12. The method of claim 1, wherein the oxidant does not include a chelating agent, an iron compound, or a pH adjuster.

13. The method of claim 1, further comprising pre-analyzing a level of the at least one contaminant in the soil of the treatment area.

14. The method of claim 1, further comprising determining feasibility of the method for the treatment area.

15. The method of claim 1, wherein the soil is at least one of a silty fine grain sand, a weathered sandstone, a fractured bedrock sandstone, a claystone, a fine grain sand, a silty sand, a silt, or a clay.

16. The method of claim 1, further comprises: mixing the oxidant with the groundwater; and
allowing the oxidant to contact the groundwater following mixing.

17. The method of claim 16, wherein the concentration of the oxidant is between about 17.5% and about 34%.

18. The method of claim 16, wherein a ratio of the oxidant to the groundwater is between about 1 lb oxidant: 0.6 gallons of groundwater and about 1 lb oxidant: 23 gal groundwater.

19. The method of claim 1, wherein a ratio of the oxidant to the soil is between about 1 lb oxidant: 49 lbs soil and about 1 lb oxidant: 105 lbs soil, wherein the oxidant is hydrogen peroxide at a concentration between about 17.5% and 34%.

20. The method of claim 1, wherein the oxidant consists of hydrogen peroxide.

* * * * *